N. BRAIBANT.
WHEEL.
APPLICATION FILED NOV. 21, 1910.

1,033,665.

Patented July 23, 1912.

Witnesses:
M. E. Gray
F. M. Meyer

Inventor:
Nestor Braibant
Attorney

UNITED STATES PATENT OFFICE.

NESTOR BRAIBANT, OF BRUSSELS, BELGIUM.

WHEEL.

1,033,665.

Specification of Letters Patent. Patented July 23, 1912.

Application filed November 21, 1910. Serial No. 593,536.

*To all whom it may concern:*

Be it known that I, NESTOR BRAIBANT, a subject of the King of Belgium, and resident of Brussels, Belgium, have invented certain new and useful Improvements in Wheels, of which the following is a specification.

This invention relates to improvements in wheels.

The object of the invention is to provide simple and economical means for mounting the tire on the felly of the wheel to equalize and distribute the strain on the parts.

Figure 1:
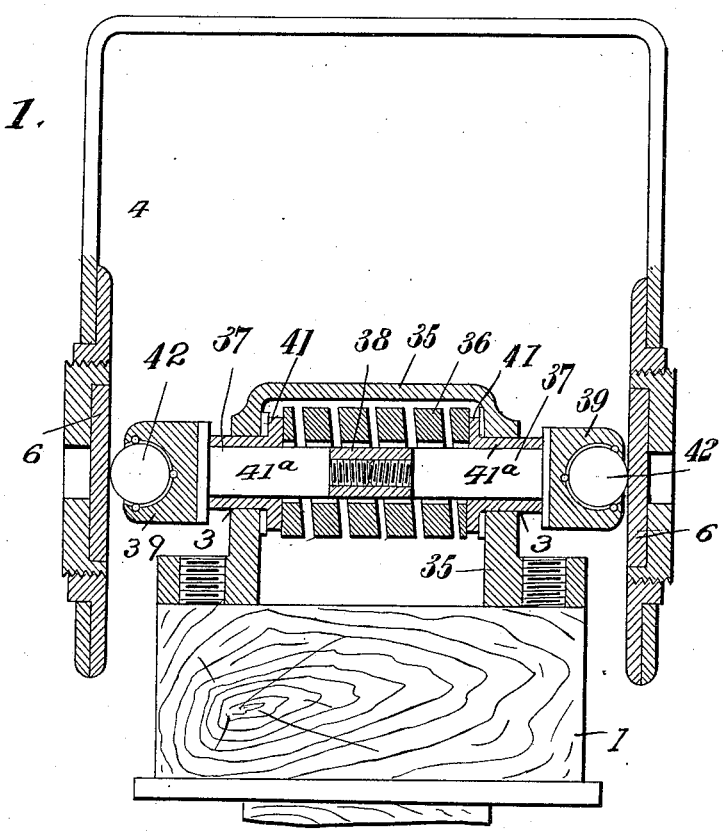
Figure 2:
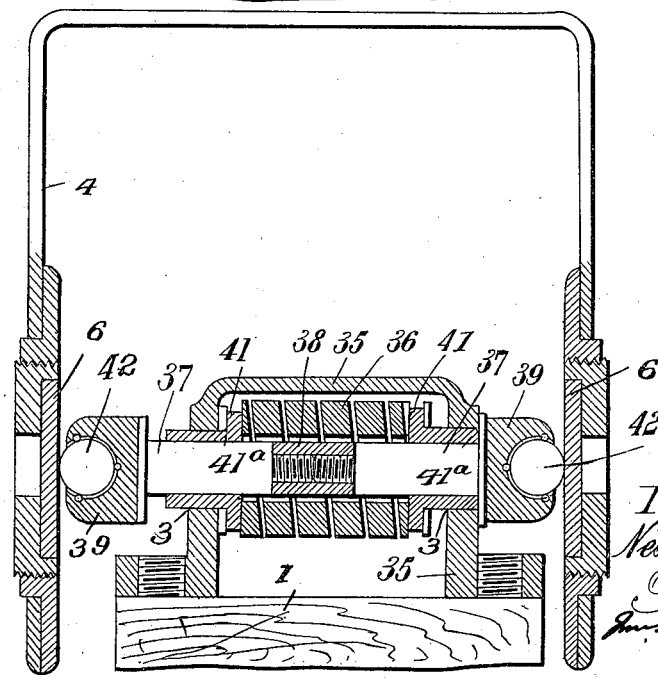

In the drawing: Figure 1 is a vertical section of a portion of a wheel, illustrating the parts constituting the invention in normal position. Fig. 2 is a similar view but illustrating the position of parts in shifted position.

1 indicates a wheel rim having mounted thereon at intervals brackets 35, only one of which is shown in the drawing. Each bracket is closed at its outer end and is provided in the side walls with horizontal openings 3, 3. Fitting in the openings 3, 3 are sleeves 41$^a$, provided with flanges 41. These sleeves form bearings for a rod comprising end sections 37, 37 and an intermediate threaded section or nut 38. The inner ends of sections 37, 37 are formed with reduced stems which are threaded to receive the nut 38, as shown clearly in the drawing. The outer end, 39, of each section 37 is enlarged and is formed with a cavity to receive a ball 42, the inner end of each enlarged end 39 bearing against the outer end of the adjacent sleeve 41$^a$.

Mounted on the rod and bearing against the flanges 41, is a spring 36, the tension of which serves to force the sleeves 41$^a$, outwardly, and as the latter bear directly on the heads 39 of the rod, the latter are retained an equal distance from the sides of the bracket 35. The sleeves project some distance beyond the sides of the bracket 35, so that the rod may have a limited lateral movement, as will be explained later on.

The tire 4 is U shape in cross section and its vertical sides are provided on their inner faces with wear plates 6 against which the balls, 42, operate. The distance between the outer surfaces of the two balls 42, equals the distance between the wear plates 6 so that at all times said balls are in contact with said wear plates.

When the wheel is passing over crowned road surfaces, the tendency of lateral strain occurs and has been found detrimental to a rigid structure and it is my purpose to overcome this difficulty. Under these circumstances when my improved wheel is employed, the tire moves laterally as shown in Fig. 2. The tire forces the rod to the left (as indicated in Fig. 2) hence the sleeve 41$^a$ on the right hand side is also moved and its flange compresses the spring 36, against the flange 41 of the sleeve on the opposite side of the bracket. This movement prevents a twisting strain on the wheel structure. Immediately the lateral strain is relieved, the spring returns the parts to normal position.

Having now fully described my said invention, what I claim and desire to secure by Letters Patent is:—

1. In a wheel the combination of a tire, an annular member within and spaced from the tire, casings mounted on the annular member, a rod extending transversely of the annular member and through each casing, balls on the ends of the rod and bearing on the inner surfaces of the tire, collars mounted on each rod, and a spring on each rod between the collars and within the casing.

2. In a wheel, the combination of a tire formed with flanges, an annular member within and spaced from the tire, casings mounted on the annular member, a sectional rod extending transversely of the annular member and through each casing and confined between the flanges of the tire, the adjacent ends of the sections of the rods being threaded to connect the same, flanged collars mounted on the rod, and a coiled spring mounted on the sectional rod and confined in the casing by the flanged collars, whereby when the tire is tilted the springs will be compressed.

In testimony whereof I have hereunto set my hand in presence of two witnesses.

NESTOR BRAIBANT.

Witnesses:
C. VAN VELSEN,
CHARLES JOHNSON.